US 8,443,423 B2

(12) United States Patent
Renno

(10) Patent No.: US 8,443,423 B2
(45) Date of Patent: May 14, 2013

(54) SECURE INFORMATION PROCESSING

(75) Inventor: Erik Knutsen Renno, Trondheim (NO)

(73) Assignee: Atmel Corporation, San Jose, CA (US)

( * ) Notice: Subject to any disclaimer, the term of this patent is extended or adjusted under 35 U.S.C. 154(b) by 120 days.

(21) Appl. No.: 13/267,933

(22) Filed: Oct. 7, 2011

(65) Prior Publication Data
US 2012/0036299 A1 Feb. 9, 2012

Related U.S. Application Data

(63) Continuation of application No. 12/198,409, filed on Aug. 26, 2008, now Pat. No. 8,051,467.

(51) Int. Cl.
*G06F 7/04* (2006.01)
(52) U.S. Cl.
USPC .............. 726/4; 710/262; 711/103; 711/163; 711/E12.008; 711/E12.098; 726/2; 726/8; 726/21; 726/27; 380/255; 713/182
(58) Field of Classification Search .................. 711/100, 711/163, 103, E12.098, E12.008; 726/4, 726/2, 18, 21, 27; 380/255; 713/182; 710/262
See application file for complete search history.

(56) References Cited

U.S. PATENT DOCUMENTS

| | | | |
|---|---|---|---|
| 7,185,159 B2 * | 2/2007 | Beinet et al. .................. | 711/163 |
| 7,260,224 B1 | 8/2007 | Ingle et al. | |
| 7,340,573 B2 | 3/2008 | Watt | |
| 7,509,490 B1 | 3/2009 | Hsu et al. | |
| 7,685,424 B2 | 3/2010 | Walmsley et al. | |
| 2002/0046342 A1 | 4/2002 | Elteto et al. | |
| 2005/0152596 A1 | 7/2005 | Walmsley | |
| 2005/0198040 A1 | 9/2005 | Cohen et al. | |
| 2006/0062070 A1 | 3/2006 | Sibigtroth et al. | |
| 2006/0136634 A1 * | 6/2006 | Gardner ........................ | 710/107 |
| 2007/0199064 A1 | 8/2007 | Pueblas | |

* cited by examiner

*Primary Examiner* — April Shan
(74) *Attorney, Agent, or Firm* — Fish & Richardson P.C.

(57) ABSTRACT

Apparatus, systems, and methods may operate to receive from a requesting device, at a memory device, a request to access a memory domain associated with the memory device, and to deny, by the memory device, the request if the memory domain comprises any part of a secure domain, and the requesting device has not asserted a secure transfer indication. Additional operations may include granting the request if the memory domain comprises some part of the secure domain and the requesting device has asserted the secure transfer signal, or if the memory domain comprises only a non-secure domain. Additional apparatus, systems, and methods are disclosed.

15 Claims, 6 Drawing Sheets

SECURE INFORMATION PROCESSING

BACKGROUND

To provide a secure processing environment, some systems employ two separate processors: one to execute secure code, and another to execute non-secure code. When a single processor is used, program execution sometimes relies on a cached memory hierarchy and a memory management unit (MMU) to identify which parts of the memory are secure and which are not. This protects memories from access by the central processing unit (CPU), but not by other bus masters, such as direct memory access (DMA) controllers and coprocessors. Thus, a non-secure application running on the CPU might program a DMA controller or a coprocessor to perform memory accesses that compromise the Confidentiality, Integrity, and Authenticity (CIA) of the system. Smaller single-processor systems (e.g., many embedded systems) may not even provide the security benefit of operating with a cache and an MMU.

DETAILED DESCRIPTION

Introduction

Figure 1:
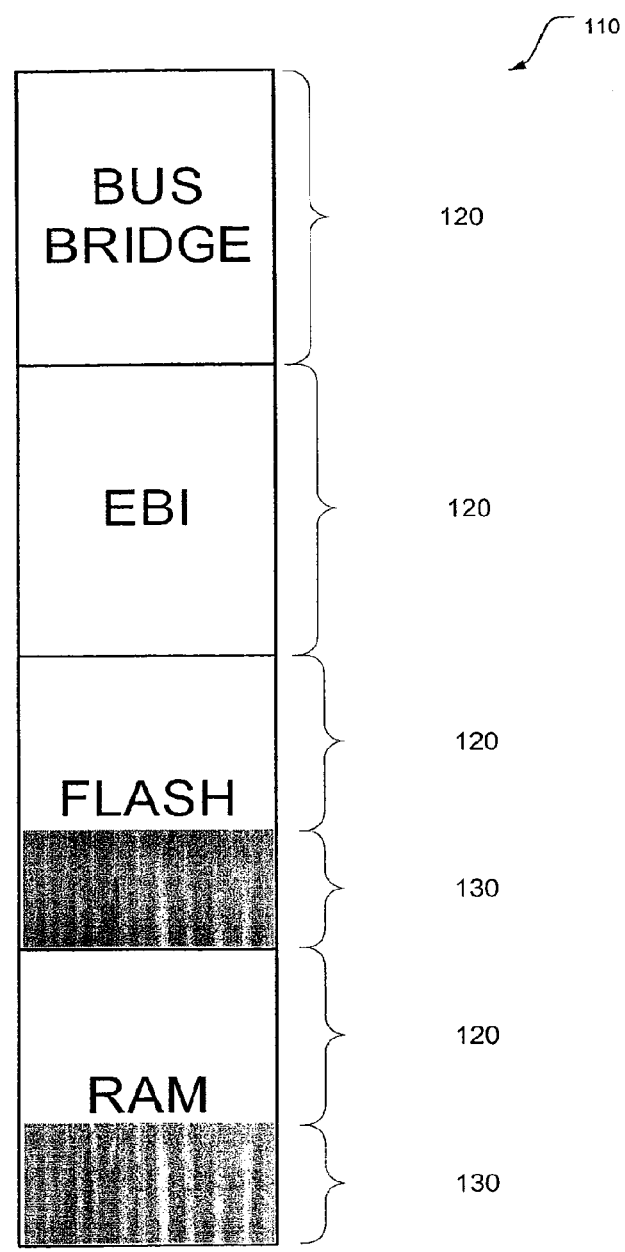
FIG. 1 illustrates a memory map according to an example embodiment.

To provide secure execution without using multiple processors, or even a cache or MMU, the hardware and software mechanisms disclosed herein have been invented. In this way, a secure (trusted) application can be executed alongside a non-secure (non-trusted) application using a single processor.

Most embodiments operate to partition processor operations into two worlds, a secure world and a non-secure world. When this occurs, code and data belonging to the secure world are not visible to the non-secure world. Similarly, code executed in the non-secure world does not operate to corrupt code, data, or execution in the secure world. Hardware mechanisms are disclosed to pass execution from the secure world to the non-secure world, and vice versa.

Address checking and security hardware can be built into the hardware of each memory that is aware of the secure-world. Using this type of distributed security system, the overhead associated with security operations can be maintained at a relatively low level, so that microcontrollers can operate successfully in conjunction with a number of bus masters and slaves, even when processing resources and available memory are scarce.

To accomplish this type of operation, the system bus can be designed to include a Secure Transfer (ST) line and a Security Violation (SV) line. All bus masters connected to the bus hardware can be fabricated to drive the ST line of the system bus. Bus masters that are not aware of the secure world may be programmed or fabricated to drive the ST line to a logical value of "0" or some other default value. The CPU and other bus masters aware of the secure world are designed to drive the ST-line to a value that depends on the security state the bus master currently occupies. For example, if the CPU is operating in the non-secure world, the CPU can drive the ST line to a logical default value (e.g., logic "0"). If the CPU is operating in the secure world, it can drive the ST line to a different value (e.g., a logic "1").

If a secure-aware memory receives an access that violates the security requirements of the accessed address (e.g., a CPU operating in a non-secure mode attempts to access a secure area of memory), the access will be aborted and the current bus master can be notified using the SV line of the system bus. The system can be expanded with secure-aware bus masters in addition to the CPU, using similar mechanisms for handling the state change from a secure state to a non-secure state, and vice versa.

DEFINITIONS

For the purposes of this document, the term "bus master" means a module coupled to a communications bus that is able to initiate the transfer of information across the bus.

A "bus slave" is a module that is unable to initiate the transfer of information across a communications bus, but can respond to a transfer that has been initiated by a bus master.

A "fuse" is a non-volatile memory element, and can be implemented using one-time programmable technology, or many-time programmable technology (e.g., an electrically-erasable, programmable read-only memory (EEPROM)).

"Non-volatile" memory devices include any memory device that retains its content when power is no longer applied, so that the retained content can be accessed at a later time. Non-volatile memory devices include EEPROM, FLASH memory, and magnetostrictive random access memory (RAM), among others.

Apparatus and Systems

As a matter of introduction, the reader should note that enabling both secure world and non-secure world operations provides the possibility of additional operational states for apparatus and systems according to various embodiments.

For example, consider that some sections of the processor memory may be reserved for code executing in the secure world. In this case, these sections can only be accessed (e.g., read/written/executed from) when the processor is operating in the secure world. The remaining sections of the processor memory can be accessed both from the secure and non-secure world.

In addition, some resources, such as memories, may be subject to privilege level permission checking, perhaps using by a memory protection unit (MPU). In this case, the security concept for various embodiments can be orthogonal to the privilege concept. That is, the privilege concept involves operating privileges that are handled by the processor, controlling access from the processor to the memory. Other bus masters are typically free to access all memories, unaffected by privilege. The security concept, on the other hand, limits access from all masters to all slaves, as well as whether processor operations can be debugged when operating in the secure world.

Thus, both the secure and non-secure memory space can be divided into one subspace that uses a privileged execution mode for access, and another subspace which can be accessed with user privilege. In this case, the resulting system can operate in four different states: (1) non-secure, non-privileged; (2) non-secure, privileged; (3) secure, non-privileged; and (4) secure, privileged.

FIG. 1 illustrates a memory map 110 according to an example embodiment, in which the secure and non-secure sections of various memories are shown. In this example, the random access memory (RAM) and FLASH memories are divided into both non-secure 120 and secure 130 areas. The other memories, associated with the bus bridge and the external bus interface (EBI), include only non-secure areas 120.

Since a memory (e.g., FLASH or RAM) can contain both secure and non-secure sections, a mechanism is implemented to check, for each access, whether the address to be accessed lies in a secure memory section. If so, then a check is made to determine whether the access is being performed by a bus master operating in the secure world. If not, then the transfer of data is aborted, and an SV error signal is returned to the requesting bus master. The bus master may handle the error in different ways, for example, by initiating an exception routine. If the security check passes, or the address to be accessed lies in a non-secure section of memory, the transfer of data is enabled.

Each bus master can provide information regarding its current security level along with bus transfer requests. Each security-enabled bus slave can use this security level information, along with mapping the access address into either the secure or non-secure address space. Address comparator circuitry may be located inside each security-enabled bus slave to perform this mapping.

The quantity of secure resources available may be configurable to provide flexibility to suit different applications. For example, secure registers, which can only be written from within the secure world, can be made available to specify the start address and size of the secure sections in each of the secure memories.

Figure 2:
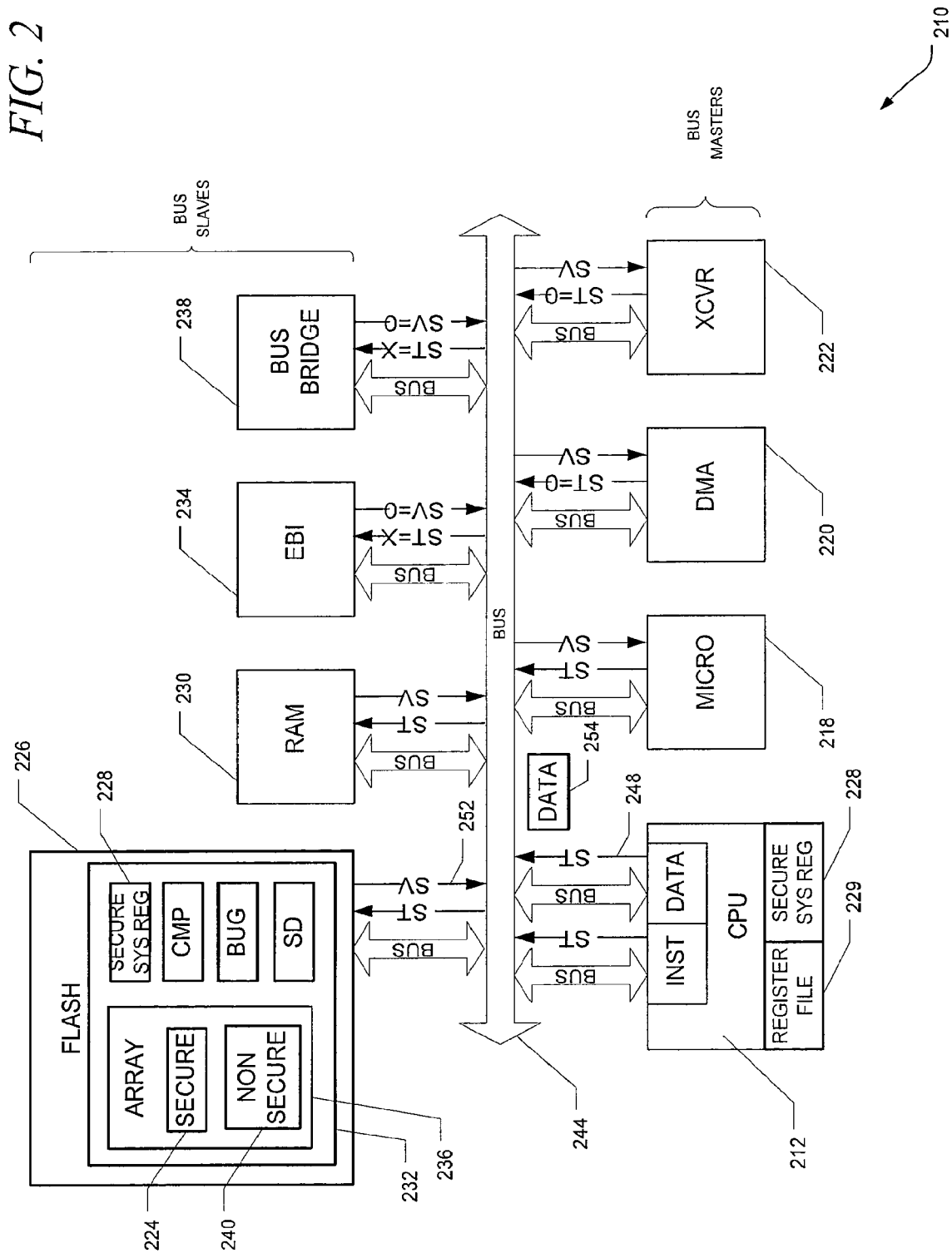
FIG. 2 is a block diagram of a secure access apparatus and system according to an example embodiment.

FIG. 2 is a block diagram of a secure access apparatus 226 and system 210 according to an example embodiment. The apparatus 226 may comprise a memory, such as the FLASH memory and/or the RAM memory of FIG. 1. For example, see the apparatus 226 and the RAM memory 230 in FIG. 2. The system 210 may comprise a microprocessor-based system in which a bus 244, including a data bus, connects several bus masters, such as a CPU 212, microprocessor 218, DMA module 220, and transceiver module 222. The system 210 may also include bus slaves, such as one or more secure access apparatus 226, RAM memories 230, EBI modules 234, and bus bridges 238. For the purposes of simplicity, it can be assumed that the EBI module 234 and bus bridge 238 are not secure-enabled, although various embodiments are not to be so limited.

The simplified data bus model described herein may include the following signals, which may comprise logic-level signals, as follows:

Valid—indicates whether the bus has a valid transfer
Write—indicates whether the transfer is a read or write
Wdata—data to write from a master to one or more slaves
Rdata—data to be read from a slave to the master
Stall—slave not ready for current transfer; freezes all values on the bus
SecureTransfer (ST)—signal from a master to one or more slaves indicating that the master is in a secure state. Slaves that are not secure-enabled disregard this signal. Masters that are not secure-enabled should drive this signal to indicate that the master is not in a secure state (e.g., as shown for the DMA module 220 and the transceiver module 222, the signal ST is driven to a logic "0" level to indicate the non-secure state).
SecurityViolation (SV)—signal from a slave to the master indicating that the current transfer has violated the security restrictions of the address for which access was attempted. Slaves that are not secure-enabled should not assert this signal (e.g., for the EBI module 234 and the bus bridge 238, the signal SV is driven to a logic "0" level so that the signal SV is not asserted)

In many embodiments, it is useful to configure different parameters of secure-enabled slaves, such as the location and size of the secure domain 224 in the memory of each slave. For example, it may be beneficial to start the secure domain 224 of a memory at the first address inside the memory. If this policy is adopted throughout a system, perhaps only the size of the secure domain 224 will be specified as a variable. This size may be application-specific, since different applications have different needs. Thus, programmability of the size may be useful. If the size of a secure domain 224 is to be determined or changed only from inside the secure world, it may be useful to locate a set of secure system registers 228 within the CPU, perhaps using one register per secure-enabled slave. If this is the case, the register contents may be routed to each slave for use in the address compare logic CMP. To reduce the logic associated with these registers and their associated address comparators, the resolution of the domain size may be limited to multiples of one kilobyte, so that the secure domain 224 in each secure-enabled memory is sized to be some integer number N of kilobytes. In some embodiments, these registers 228 may also be implemented in a distributed fashion, such as placing one or more such registers 228 in each secure-aware bus slave.

It should be noted that although the apparatus 226 is shown as a FLASH memory in FIG. 2, various embodiments are not to be so limited. For example, any of the bus slaves or bus masters shown in FIG. 2 (e.g., the slave devices 226, 230, 234, and 238; and master devices 212, 218, 220, and 222) can include a substrate 232 to support an array of memory 236 having both secure domains 224 and non-secure domains 240. The apparatus 226 may further include one or more registers 228, address comparator logic CMP, and one or more secure domain fuses SD. Thus, the apparatus 226 may comprise a memory chip, a memory controller, or even a larger device, such as a microcontroller with embedded flash, and therefore, many embodiments may be realized.

For example, an apparatus 226 to implement distributed security memory access may comprise a substrate 232 with an array of memory 236 cells and one or more registers 228 supported by the substrate 232. The registers 228 may be used to define a subset of the array 236 to be included in a secure domain 224, wherein access to the secure domain 224 is granted after a request to access the secure domain 224 is received in conjunction with a secure transfer indication (e.g., the signal ST 248 asserted in combination with determining that a designated secure register status bit has also been set, as described below).

In some embodiments, the apparatus 226 may comprise one or more secure domain fuses SD having states to enable and disable secure access to the array 236. Thus, the apparatus 226 may include a fuse that enables/disables secure state functionality. In some embodiments, the apparatus 226 may comprise a secure domain fuse SD having states to enable and disable security permission checking for accesses to the array 236, and to determine whether a system 210 coupled to the apparatus 226 boots in a secure world or a non-secure world The secure domain fuse SD can be used to restrict access both to the secure domain of memories, and also to secure system registers (e.g., the registers 228, such as the SS_ADR*, SS_RAR, SS_RSR, etc. registers discussed below) and any other secure resource present in the system 210. The apparatus 226 may further comprise a secure debug fuse BUG having states to enable and disable one or more of tracing, single-step, or breakpoint activity associated with information stored in the secure domain 224.

As noted previously, the apparatus 226 may include one or more secure system registers 228 to define at least one of a size or a location of the secure domain 224 within the array 236. The register(s) 228 can be loaded at boot time to define the secure domain 224 starting address and/or size so that it can be accessed. The array 236 in the apparatus 226 can be made up of RAM, FLASH, EEPROM, magnetostrictive memory, other non-volatile memory, or a combination of these.

Many other embodiments can be realized. For example, a system 210 to implement distributed security memory access for a variety of apparatus 226, such as FLASH memory, RAM 230, EBI modules 234, and bus bridges 238, may comprise a wireless transceiver 222, one or more processors 212, 218 to send data 254 to the wireless transceiver 222, and one or more nonvolatile memory devices (e.g., apparatus 226 comprising FLASH memory) to store the data 254. In some embodiments, the system 210 may comprise any one or more of a cellular telephone, a desktop computer, a laptop computer, a personal digital assistant (PDA), or any other processor-driven computation device.

In some embodiments, as will be described in more detail below, the system 210 may comprise secure system registers 228 to define the execution status and configuration of the secure domain 224. The secure system registers 228 can not be written unless a secure state is indicated by the processor 212, 218. The secure system registers 228 can be read regardless of the system being in secure or non-secure state. This allows the registers 228 to be used to pass information and status from the secure state to the non-secure state.

In some embodiments, the processor 212 in the system 210 may comprise a register file 229 and a set of secure system registers 228 to receive information from a nonvolatile memory device (e.g., apparatus 226) defining at least one of a size or a location of the secure domain 224 in the array 236. Thus, there may be some registers 228 in the processor 212 that are capable of secure access mode operation; these registers 228 can be loaded by execution of instructions in the secure mode or automatically by hardware as part of the boot or power-up sequence of the processor 212. The registers 228 may form a portion or an extension of the register file 229 in some embodiments.

Any of the components previously described can be implemented in a number of ways, including simulation via software. Thus, the system 210; bus 244; processors 212, 218; DMA module 220; transceiver module 222; secure domain 224; apparatus 226; register file 229; RAM 230; EBI modules 234; bus bridges 238; registers 228; substrate 232; array 236; non-secure domains 240; signals 248, 252; secure debug fuse BUG; address comparator logic CMP; and secure domain fuses SD may all be characterized as "modules" herein.

These modules may comprise hardware circuitry, single or multi-processor circuits, memory circuits, software program modules and objects, firmware, and combinations thereof, as desired by the architect of the apparatus 226 and system 210, and as appropriate for particular implementations of various embodiments. The modules may be included in a system operation simulation package such as a software electrical signal simulation package, a power usage and distribution simulation package, a power/heat dissipation simulation package, a signal transmission-reception simulation package, a circuit emulator, or any combination of software and hardware used to simulate the operation of various potential embodiments. Such simulations may be used to characterize or test various embodiments, for example.

It should also be understood that the apparatus and systems of various embodiments can be used in applications other than desktop or laptop computers having single or multi-core processors. Thus, various embodiments of the invention are not to be so limited. The illustrations of apparatus 226 and systems 210 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, and application-specific modules, including multilayer, multi-chip modules. Such apparatus and systems may further be included as sub-components within a variety of electronic systems, such as data bridges, switches, and hubs; televisions and cellular telephones; personal computers and workstations; radios and video players; and vehicles, among others.

Register Operations

Figure 3:
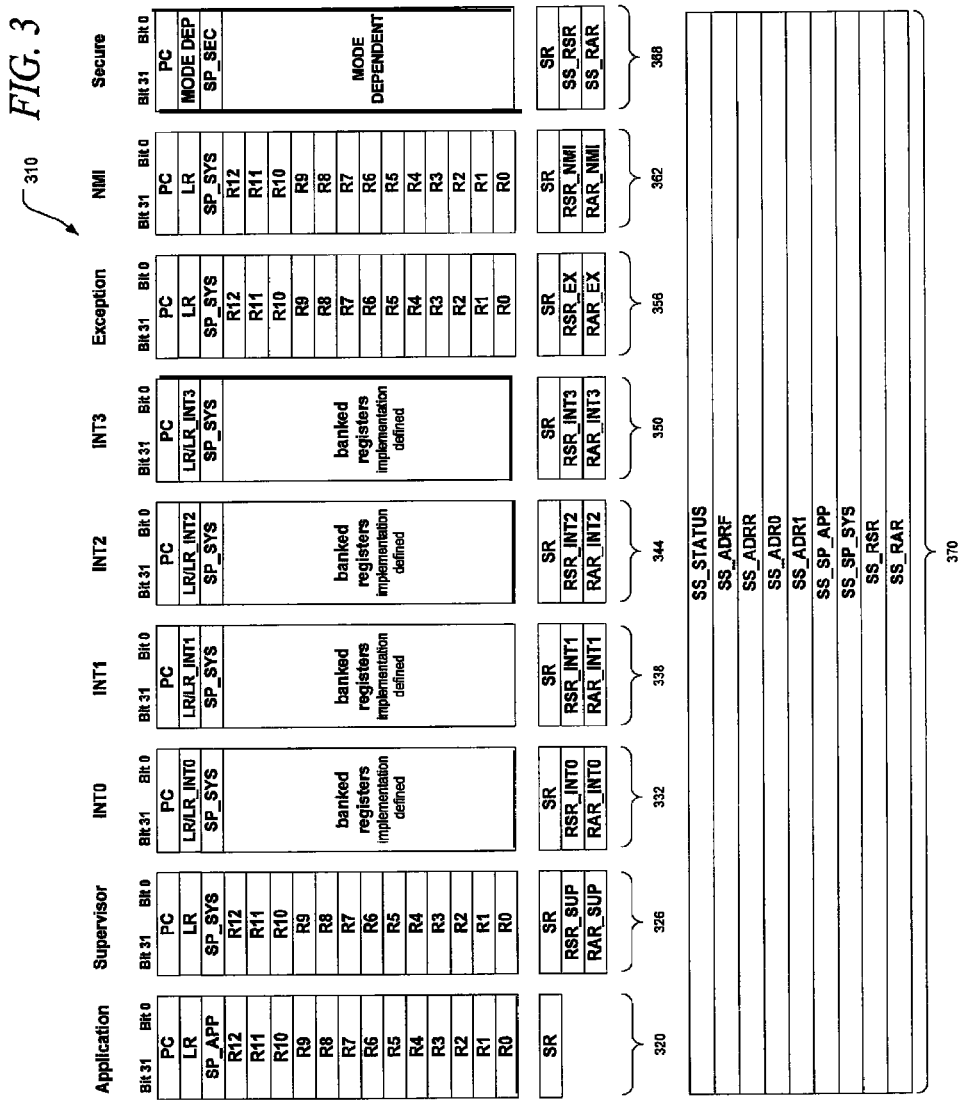
FIG. 3 illustrates a register file with security extensions according to an example embodiment.

FIG. 3 illustrates a register file 310 with security extensions according to an example embodiment. The register file 310 may be similar to or identical to the register file 229 associated with the processor 212 of FIG. 2. It should be noted by way of introduction that bus masters operating in the secure world can access both secure and non-secure domains in memories. Similarly, non-secure stack pointers are available in the secure world through read-only secure system registers to facilitate parameter passing.

Referring back to FIG. 3, it is noted that, for purposes of simplicity, a register file 310 similar to that used in the Atmel® AVR32 32-bit reduced instruction set (RISC) microprocessor core architecture is shown, although the various embodiments are not to be so limited. Here, the use of secure access and the ability to assert/indicate a secure state adds another register file context, the secure context 368, to non-secure contexts, such as the application context 320; the supervisor context 326; the interrupt contexts INT0 332, INT1 338, INT2 344, and INT3 350; the exception context 356; and the non-maskable interrupt (NMI) context 362.

So as not to add unnecessary detail that might obscure the explanation of how various embodiments operate, some of the register designations that are common to the AVR32 architecture and other architectures are shown in FIG. 3, but not discussed explicitly herein. Detailed discussion of these registers and their operations can be found in the Atmel® AVR32 Architecture document, Rev. 32000B-Nov. 7, 2007, and related versions, published by Atmel Corporation of San Jose, Calif., as well as in many other documents that are well-known to those of ordinary skill in the art.

In order to separate the secure world from the non-secure world, the secure world has its own shadowed stack pointer SP_SEC. This stack pointer SP_SEC is automatically activated when the system enters the secure world. As is the case with operating in the non-secure world, the other registers available in the register file in the secure world depend on the operational mode of the processor prior to entry into the secure world of operation. These modes include the supervisor mode, the application mode, and the interrupt mode. Interested readers can refer to the aforementioned Atmel® AVR32 Architecture document for more details on register file shadowing and the availability of shadow registers in various modes.

A number of secure system registers 370 may also exist. These registers 370 may be similar to or identical to the registers 228 of FIG. 2. The registers 370 are writeable only from the secure world, and readable in both secure and non-secure worlds. When an attempt to write to these registers is made from outside of the secure world, a privilege violation exception occurs. These registers may comprise any number of bits, including 32 bits, and may include, for example:

- SS_STATUS—The semantics of this status register can be defined by the secure world application, and this register may be cleared on reset. This register can be used to pass status information from the secure world to the non-secure world (e.g., whether thread rescheduling is allowed/not allowed, etc.). It can also be used for housekeeping purposes as part of secure world operations.
- SS_ADRF, SS_ADRR—These registers may be used to define the starting address and size of the secure domain in various memories. Each secure domain may be designed to comprise a size that is incremented in one kilobyte steps, so in some embodiments, the ten least significant bits (LSBs) in these registers are set to zero. These registers may be loaded with a predetermined value during reset, so that the sizes of the protected domains are correct after reset occurs. Logic may be implemented to preload these registers with values found in non-volatile memory (FLASH memory or FLASH fuses) during reset operations.
- SS_ADR0, SS_ADR1—These registers may be reserved to secure additional memory regions (supplementing those specified by the SS_ADRF, SS_ADRR registers), by defining the starting address and size of additional secure domains. For example, the secure domain in a memory may begin at the start of the address space reserved for the memory, but this may differ for different memories. These registers may also be loaded with a predetermined value during reset, so that the size and beginning address of the protected domains are correct after reset. Again, logic may be implemented to preload these registers with values found in non-volatile memory (FLASH memory or FLASH fuses) during reset.
- SS_SP_SYS, SS_SP_APP—These registers may comprise read-only registers, and can be directly remapped from the other contexts of the register file 310. These registers may be used for return value passing on the stacks.
- SS_RAR, SS_RSR—These registers may comprise the return address register and return status register, respectively, associated with a secure supervisor call (SSCALL) instruction when the SSCALL is executed. These registers may be cleared on reset.

If desired, a single fuse may be reserved as a mechanism to enable or disable secure world operations. This fuse can be called the Secure State Enable (SSE) fuse. The SSE fuse can be used in systems that do not need secure functionality, or to ensure backward compatibility with existing code. If the SSE fuse is not programmed, the system will boot with the secure state indication bit SR[SS] cleared, as in previous versions of the AVR32 devices, and secure world functionality will be disabled. In some embodiments, the SSE fuse is similar to or identical to the secure domain fuse SD of FIG. 2.

Returning now to FIG. 3, it should be noted that the system can be set up to boot from address 0x8000_0000. The secure state indication bit SR[SS] can be set or cleared automatically by hardware immediately after reset, depending on the state of the SSE fuse. If AVR32 architecture is used, the system may be set up to boot in supervisor mode.

To pass back and forth between the secure and non-secure worlds, two instructions may be used: SSCALL can be set to jump to a fixed address, such as 0x8000_0004. This is the address of the secure gatekeeper application. The gatekeeper comprises secure software that controls all behavior in the secure world. The gatekeeper checks the validity of any SSCALL instructions that are executed, checks for potential stack overflow/underflow, schedules secure threads, pre-empts secure threads in the case of interrupts and exceptions, and more.

An SSCALL instruction operates to activate the dedicated secure stack pointer, SP_SEC, which is the secure world stack pointer that points into secure memory space. At this time, the General Interrupt Mask bit in the Status Register (SR[GM]) can be set to mask all interrupt requests. Interrupts can be re-enabled at a later time if desired. Also, the secure status register bit SR[SS] can be set to indicate the system is in the secure state. In most embodiments, this bit can not be manipulated by any instructions other than SSCALL (a call to execute instructions or process data in the secure world) and RETSS (a return from the secure world to the non-secure world).

As is well-known to those of ordinary skill in the art, the AVR32 architecture has privileged and unprivileged modes of operation. Thus, if the secure access mechanism described herein is applied to the AVR32 architecture, as shown in FIG. 3, an SSCALL operates to place the CPU in a privileged mode.

The AVR32 architecture has several privileged modes, named Supervisor, INT0, INT1, INT2, INT3, Exception and NMI, and the current mode is identified by the mode bits in the Status Register SR. In the secure world, the stack pointer SP_SEC is always used, regardless of the mode bit settings. The return address and return status register content are stored in the secure system registers SS_RAR and SS_RSR. These can later be stacked on the secure stack if nested SSCALLs are desired.

Note that register SS_RAR will contain the address of the SSCALL, not the address of the instruction following the SSCALL, as might be expected. This is because the RETSS instruction is used to return to the instruction following the SSCALL in the non-secure world when execution in the secure world is finished. The RETSS instruction will return to the address in SS_RAR and restore the status register from the register SS_RSR. Thus, the content of register SS_RAR is incremented by two (assuming 32 bit AVR32 architecture) before the RETSS instruction is executed if one wishes to return to the instruction after the SSCALL.

Parameters and results may be passed between the secure and the non-secure world through the register file, through memory addressed by a pointer, or the stack. The secure and non-secure worlds can share most of the registers in the register file, which facilitates parameter and result passing. The gatekeeper application and compiler conventions can affect how data is passed between the secure and non-secure worlds, for both SSCALL and RETSS instructions. The secure read-only system registers SS_SP_APP and SS_SP_SYS reflect the SP_APP and SP_SYS stack pointers, and can be used to access values on the respective stacks.

Before returning to the non-secure world, the gatekeeper can operate to ensure that only certain information is available in the non-secure world. This may involve wiping register file scratchpad registers and non-secure scratchpad memory used by the secure world prior to returning to operation in the non-secure world.

Interrupt Processing

Processing in the secure world may be interrupted. To handle interrupt requests (IRQs) and exceptions in the secure world, execution of the SSCALL instruction may operate to automatically set the SR[GM] bit to mask any interrupts. In the secure world, the SR[GM] bit may also operate to mask the NMI.

While secure code should be written so that exceptions never occur, any exceptions that do in fact occur when operating inside the secure world can be made to branch to a secure exception handler, at a fixed address of 0x8000_0008, for example. It is up to the secure exception handler how to handle any secure exceptions that arise. The address of the last executed instruction in secure mode and its status register value can be automatically saved in the SS_RAR and SS_RSR registers before jumping to the secure exception handler. The SR[GM] bit can be automatically set to mask any interrupts when jumping to the secure exception handler. The previous contents of the SS_RAR and SS_RSR registers should be preserved, if desired. Since every secure mode exception can be made to jump to the same handler, there may be no convenient way to identify which exception was received.

If the SR[GM] bit is cleared by the gateway, an NMI can be received when operating in the secure world. If an NMI is then received while executing in secure mode, the secure code will jump to the secure NMI handler, perhaps at the fixed address 0x8000_000C. The address of the last executed instruction in secure mode and its status register value may be automatically saved in the SS_RAR and SS_RAR registers before jumping to the secure NMI handler. The SR[GM] bit can be automatically set to mask any additional interrupts when jumping to the secure NMI handler. Again, the previous contents of the SS_RAR and SS_RSR registers should be preserved, if desired, before clearing SR[GM].

If the SR[GM] bit is cleared by the gateway, interrupts can be received when in the secure world. The SR[I0M] to SR[I3M] bits can still be used to mask individual interrupt levels. If an interrupt is received in secure mode, the secure code can be made to jump to the secure interrupt handler, perhaps at the fixed address 0x8000_0014. The address of the last executed instruction in secure mode and its status register value can be saved in the SS_RAR and SS_RSR registers before jumping to the secure interrupt handler. The SR[GM] bit can be automatically set to mask any interrupts when jumping to the secure interrupt handler. The previous contents of the SS_RAR and SS_RSR registers may be kept if needed, before clearing SR[GM] mask bit.

The secure interrupt handler should eventually return to the non-secure world in order to handle the interrupt request. Before returning, the secure interrupt handler should perform any desired housekeeping, such as cleaning up the register file 310 and making sure that secure data is not available to the non-secure world. Data used for a correct return back into the secure world after the interrupt has been serviced may also be saved, possibly on the secure stack. This may include the address of the secure world instruction that was interrupted, along with its status register value.

Before returning to the non-secure world, the secure interrupt handler should check that the SS_RAR register contains the value of the status register as it was when the secure world was entered by the SSCALL instruction. Also, the SS_RAR register should point to the original SSCALL instruction, not the instruction after SSCALL. A RETSS instruction can be used to return to the SSCALL instruction that originally called for entry into the secure world. When this SSCALL instruction enters the pipeline, the pipeline should become aware that an interrupt is pending, and the interrupt will be processed, instead of executing the SSCALL instruction. When interrupt processing has finished, the RETE instruction returning from the interrupt routine can be used to cause the SSCALL instruction to be re-executed, returning control to the gateway in the secure world. The gateway can then resume execution of the interrupted secure code.

It may be the case that interrupting secure world processing operates to reschedule non-secure threads. In this case, no return will be made to the SSCALL when the interrupt handler has finished its processing. In such instances, the gatekeeper application should be implemented in such a way that the rescheduling is properly handled.

For example, it may be that the gateway can be made thread-aware. Another possible mechanism is that the secure interrupt handler sets an application-defined bit in the secure system register SS_STATUS. This value can be used by the operating system (OS) scheduler to inhibit rescheduling by interrupts that have interrupted secure world application execution. If the OS chooses to disregard the SS_STATUS bit, the gateway can detect this situation and terminate the application, or the gateway can ignore rescheduling operations, and recommence the interrupted secure code upon execution of the next SSCALL. This series of operations should result in completing execution of the SSCALL from the original thread, and in returning its values to another thread. Thus, while the threads running in the non-secure world might be corrupted, secure world operational integrity can be preserved.

Debug Operations

A fuse may be reserved to enable or disable on-chip debug (OCD) and other debug functionality when operating in the secure world. This fuse can be called the Secure State Debug Enable (SSDE) fuse, and in some embodiments, may be similar to or identical to the fuse BUG in FIG. 2.

In some embodiments, the security of executing code can be compromised if its behavior in the secure world is observed. In that case, debug functionality such as single-stepping, breakpoints, and program/data trace should be disabled when executing in the secure world. However such functionality may be useful when secure code is originally developed. Fuses are therefore well-suited for implementing SSDE functionality.

Tracing, breakpoints, and single-step functionality can be inhibited when in the secure world if the SSDE fuse is cleared. In the non-secure world, the SSDE fuse has no effect, and the OCD system behaves as usual. Thus, the SSDE bit, when set, allows normal debugging of secure world code during development activity.

If the SSDE bit is set, instructions executed between SSCALL and RETSS instructions should not be traced. Breakpoints should be taken before the instruction is executed. Therefore, if the SSDE bit is set, a breakpoint on an SSCALL instruction should be taken, but a breakpoint on an RETSS instruction should be disregarded. In this way, breakpoints are not taken when operating in the secure world.

If the SSDE bit is set, debug exceptions such as single-step and breakpoint can be made to jump to handler address, such as 0x8000_0010, instead of the standard debug handler address. RAR_DBG and RSR_DBG registers can be updated, together with the same trace messages as occur in the non-secure world. The SS_RAR and SS_RSR registers are not updated in that case.

A Joint Test Action Group (JTAG) chip erase command may operate to erase all secure memory contents, including fuses. That is, during this type of operation, all volatile memories are cleared to prevent security breaches. Hardware operating as a bus master and performing volatile memory clear operations as a part of JTAG chip erase, operations should operate to control the ST bus line when in JTAG chip erase mode so that secure memory ranges in the volatile memories can be accessed for clearing stored content. Those readers seeking further information about JTAG operations are encouraged to refer to the Institute of Electrical and Electronic Engineers (IEEE) Standard 1149.1-2001, titled "Standard Test Access Port and Boundary-Scan Architecture", published in 2001, and later versions.

Slave Operations

For each bus slave, sections of embedded memory may be reserved for use in the secure world. Any attempted access to these sections from the non-secure world should then result in a security violation (noted by assertion of the SV signal) and aborted access. The secure system registers SS_ADRF and SS_ADRR can be programmed with the size of the secure domains. When the domains are sized in multiples of one kilobyte, address checking performed at each memory access may be faster and simpler.

When operations are conducted according to the principles outlined herein, at the time of system boot, immediately after reset occurs, all locations in memories having secure domains can be considered to be secure by default. This is useful because the size of the secure domain may not be precisely known before the SS_ADRR, SS_ADRF, SS_ADR0 and SS_ADR1 registers have been written by the boot handler. Once these secure system registers have been updated with valid content, a mechanism should be put in place to indicate to the secure slave that this has occurred. For example, the least significant bit in the SS_ADR* registers may be used to indicate validity of the content. In this case, it may be established that bit 0 is written with a logic "1" to indicate that the content of the address register has been updated with a valid value. Until this has occurred, the entire memory should be considered as the secure domain, and no non-secure access should be permitted. Alternatively, hardware state machines may preload the SS_ADR* secure system registers with values stored in secure non-volatile memory after system reset and before any instruction execution or debug action is allowed.

Many AVR32-compatible devices have on-chip FLASH memory that provides non-volatile fuses. Two of these fuses can be reserved for the SSE and SSDE bits. Once these fuses have been programmed, they can be designed so that only a full JTAG chip erase operation can clear them. The JTAG chip erase operation will also erase the secure content of the device.

A flash controller may also be designed to contain address checking mechanisms to inhibit erasing/programming pages in the secure memory space. In this case, the only way to erase these pages is by using a full chip erase, which clears both volatile and non-volatile memories.

Gateway Operations

The gateway software can have a major effect on the system operational security. A security flaw in the gateway may even compromise the security of the entire system. In many cases, the design of the gateway is largely up to the designer of the secure world application and it's application interface. Simple systems with no OS may have only a simple gateway.

In non-secure systems running an OS, the gateway may become more complex if interrupts are enabled when operating in the secure world. As demonstrated above, the gateway can be made arbitrarily complex by adding support for multiple secure threads, nested SSCALLs, etc.

The gateway design may be simplified if the gateway is allowed to deny SSCALLs and return a specific error status when the SSCALL can not be serviced at a given time. The code executing the SSCALL can be designed to simply retry the SSCALL after some selected time period, or the OS scheduler can schedule another thread.

The gateway should be designed so that no secure content is made available to the non-secure world. This goal may be assisted by wiping the secure register file and memory content before executing a RETSS instruction. The gateway should also operate to ensure that all memory accesses are made to sensible addresses. All pointers received from the non-secure world should be sanity checked, to avoid, for example, passing return values on a non-secure stack that reference the secure address space. Also, the gateway should keep track of its own stack and memory consumption, to avoid nested SSCALLs that cause secure memory overflow/underflow, for example, leading to a security breach.

Methods

Figure 4:
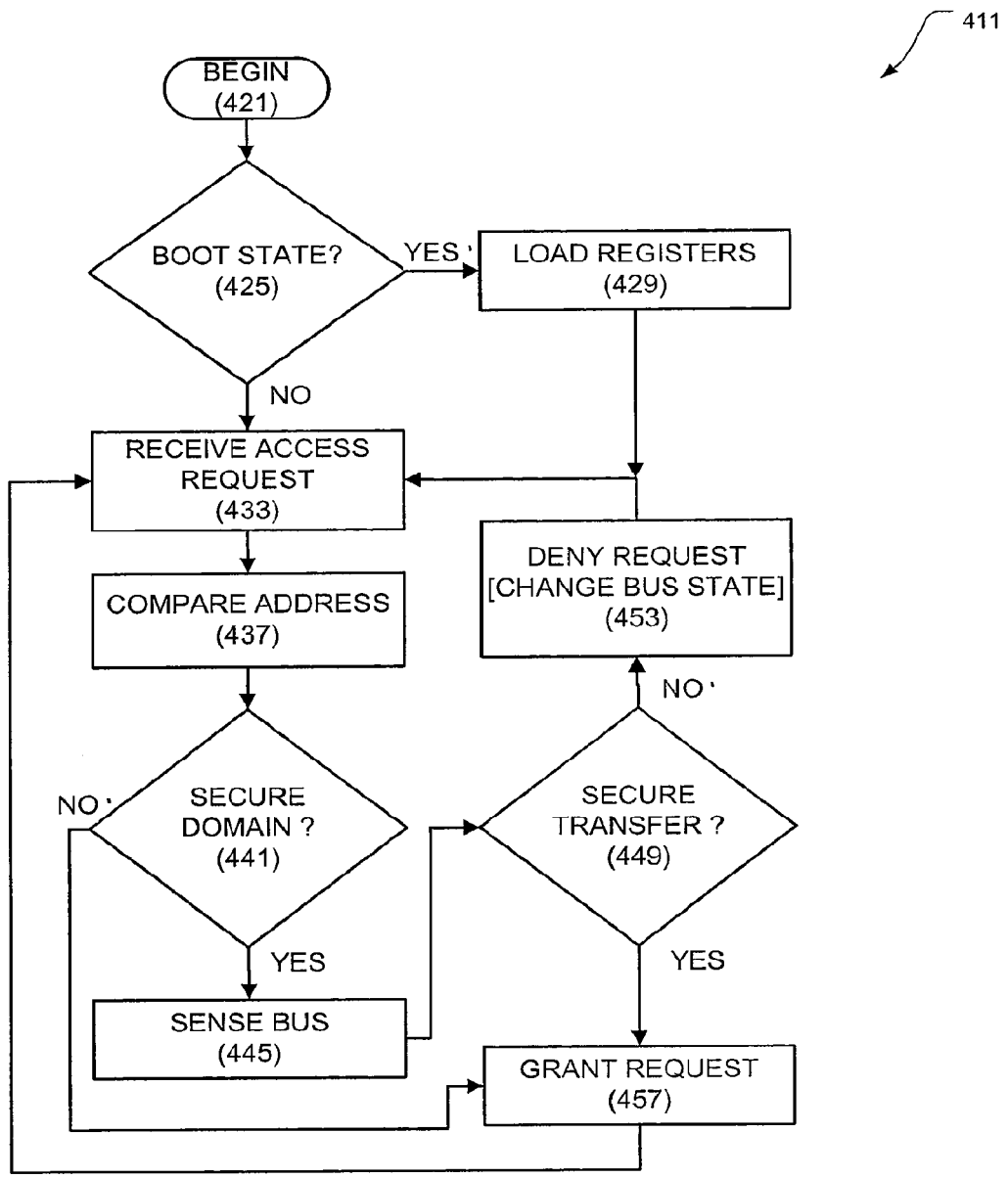
FIG. 4 is a flow diagram of various distributed security access methods according to an example embodiment.

Some embodiments may include a number of methods. For example, FIG. 4 is a flow diagram of various distributed security access methods 411 according to an example embodiment. These methods 411, and those methods 511 shown in FIG. 5, can be executed in conjunction with the use of hardware, such as that shown in FIGS. 2 and 3. Thus, when a processor is mentioned in the following discussion in conjunction with the methods 411, 511 of FIGS. 4 and 5, respectively, the reader may refer to the processor 212 of FIG. 2. Similarly, when reference is made to a memory device in conjunction with the methods 411, 511 of FIGS. 4 and 5, respectively, the reader may refer to the apparatus 226 and/or RAM memory 230 of FIG. 2. Finally, when reference is made to registers in conjunction with the methods 411, 511 of FIGS. 4 and 5, respectively, the reader may refer to the register file 310 of FIG. 3. Other devices and signals that may be used in conjunction with the methods 411, 511 of FIGS. 4 and 5, respectively, and may be further understood by referring to the hardware and signals with like names illustrated in FIGS. 2 and 3.

Thus, in some embodiments, a method 411 that implements distributed security memory access may begin at block 421 and continue on to block 425 with detecting existence of a boot state. If the boot state is detected at block 425, then the method 411 may continue on to block 429 with loading, during the boot state, at least one register in a processor coupled to a memory device to define the size and/or location of the secure domain in the memory device. Defaults for either the size and/or location may be used in some embodiments. For example, only the beginning, middle, or ending location of the secure domain may be used to define the size and/or location of the secure domain.

The boot state can be used for booting the memory device as part of a system e.g., a processor coupled to the memory device. The size of the secure domain may be a number of bytes, or a range of addresses, for example. The location of the secure domain may be fixed or programmable. As noted previously, the size of the secure domain can be defined in multiples of one kilobyte, perhaps reducing the amount of logic used to implement associated memory device secure domain registers and comparators.

In many embodiments, the registers that are loaded in the boot state are inside the processor, not inside the memories. However, the memories may be connected to these registers through dedicated busses. During boot state operations, the SSE fuse can be read from non-volatile memory in the processor, and used to set the initial value of the SS bit in the status register. If the SSE fuse is set, the SR[SS] bit is set, otherwise, the SR[SS] bit is cleared. This determines whether the processor boots in the secure state or not.

In many embodiments, if the boot state is not detected at block 425, or the registers have been loaded at block 429, the method 411 continues on to block 433 with receiving from a requesting device, at the memory device, a request to access a memory domain associated with the memory device.

The method 411 may go on to include, at block 437, comparing, in the memory device, an access address associated with the request, and a range of secure domain addresses associated with the secure domain. In this way, the memory device can operate to compare the access address with the addresses in the secure domain to determine whether access will be granted or denied.

The method 411 may go on to include, at block 441, determining whether the memory domain associated with the request comprises any part of the secure domain. If not, then the method 411 may continue on to block 457, where the request is granted.

If the domain associated with the request is part of the secure domain, as determined at block 441, then the method 411 may include sensing the state of a secure transfer bus line coupled to the memory device at block 445, and then go on to determine whether the secure transfer indication has been asserted at block 449. If the secure transfer indication has not been asserted, then the method 411 may go on to block 453 to include denying, by the memory device, the request when the memory domain comprises part of the secure domain, and the requesting device has not asserted a secure transfer indication. Denying the request may comprise indicating a security violation by changing the state of a security violation bus line coupled to the memory device. For example, the memory device can assert a security violation bus signal. A secure access violation can trigger a bus error exception, in turn, so that the responsible application is alerted that the access has failed.

As noted previously, the privilege to access a particular memory domain can be independent of the state of the secure transfer indication. That is, a secure domain, or a non-secure domain can each be used in conjunction with privileged or non-privileged access, since the use of privilege for memory access can be orthogonal to the domain type to be accessed.

If the secure transfer indication has been asserted, as determined at block 449, then the method 411 may go on to block 457 to include granting the request when the memory domain comprises at least part of the secure domain and the requesting device has asserted the secure transfer signal (or if the memory domain associated with the request comprises only a non-secure domain, as note with respect to block 441 above).

The memory device in such embodiments might comprise a memory integrated circuit, a memory controller, or a memory forming part of a larger processor device (e.g., the flash memory in an Atmel® AVR32 processor). The secure state can be indicated when the SR[SS] bit is set. The secure transfer indication (e.g., the ST signal) can be set when a data transfer is to occur within the secure state. If an instruction other than a data transfer instruction is to be executed in the secure state (e.g. an ADD instruction), a secure state can be indicated by setting the SR[SS] bit, while leaving the transfer indication clear.

Figure 5:
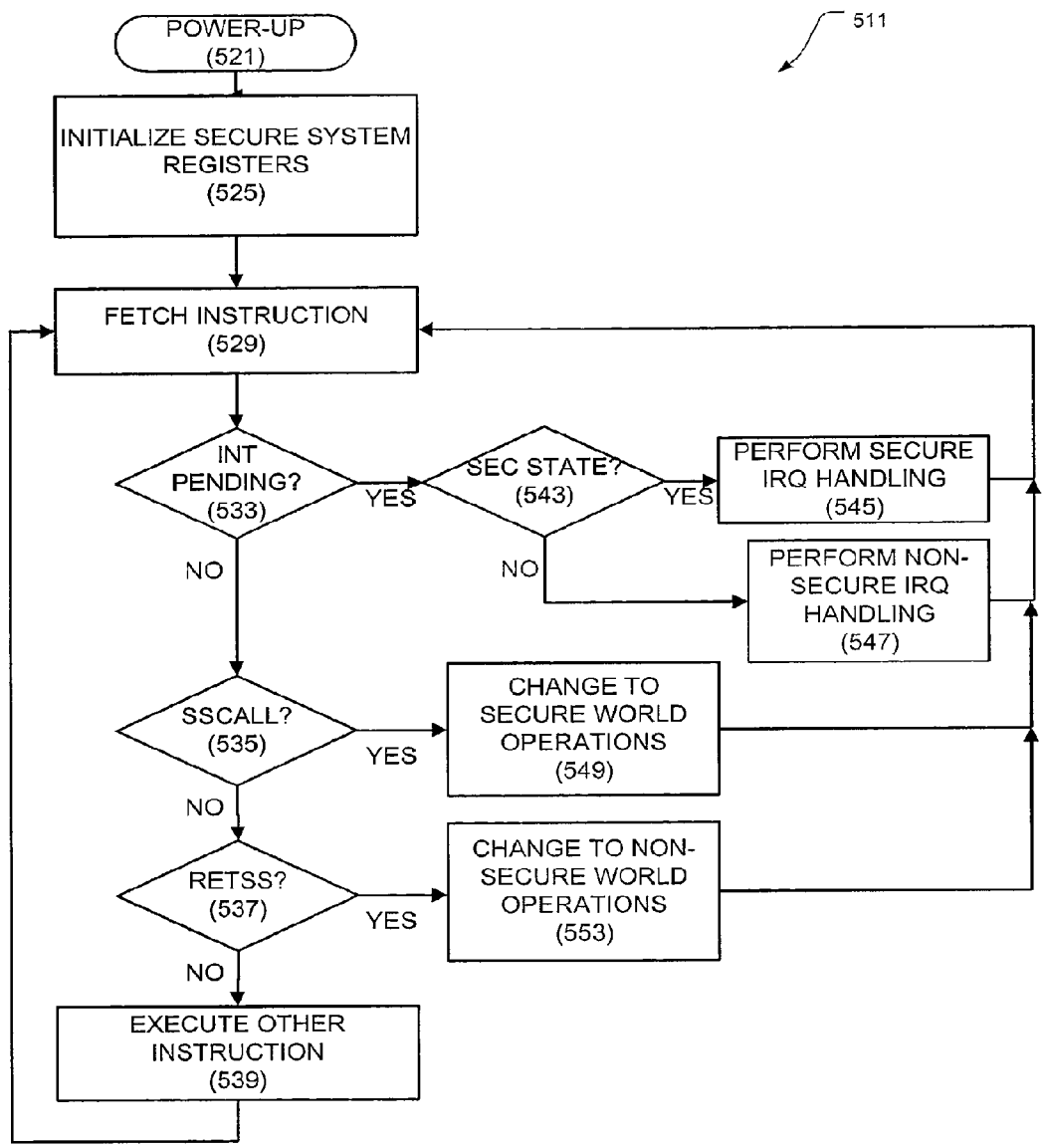
FIG. 5 is a flow diagram of instruction execution according to an example embodiment.

For example, FIG. 5 is a flow diagram of instruction execution according to an example embodiment. Thus, a method 511 that implements distributed memory access security may begin at block 521 at system power-up, and continue on to block 525 with reading the size and/or location of the secure domain from a non-volatile memory device into the bus master. In this way, during system boot operations, the bus master can read information from the memory device that defines access to the secure domain. For example, the CPU as a bus master can read the information that defines the size and location of the secure domain from FLASH memory at boot time, and then store the information inside the SS_ADR* registers located inside the CPU. The contents of these secure registers can then be routed on dedicated busses to the associated secure memories. The SR[SS] bit can also be preloaded with the value of the SSE fuse, determining if the system boots in secure or in non-secure state. Thus, the activity at block 525 may include initializing the secure system registers from memory, such as flash memory.

The method 511 may go on to block 529 to fetch an instruction. Before this instruction is decoded and executed, the CPU hardware can determine whether an interrupt INT is pending in block 533. For simplicity, block 533 uses the term INT to collectively cover interrupts that originate via INT0, INT1, INT2, INT3, NMI interrupt inputs and Exceptions, including those that are processed using the AVR32 architecture. Of course, the various embodiments are not to be so limited. Other types of processor architecture may be used to implement the interrupt processing described herein. If an INT is pending, control passes to block 543 performing possibly different actions depending on whether the system is in a secure or non-secure state.

If it is determined that the INT request is received in the secure domain at block 543, then the method 511 may continue on to block 545 to perform secure world interrupt handling. The secure world interrupt handling may be performed differently from interrupt handling in the non-secure world. In the secure world, NMI and EX events have dedicated handler addresses that are different from their addresses in the non-secure world. INT0-INT3 have a common handler address that is different from the non-secure world, where INT0-INT3 may be autovectored.

The activity at block 545 may including storing the program counter of the interrupted instruction in the SS_RAR register, and its status register value in SS_RSR register. Thereafter, the SR[GM] bit can be set to mask any other pending interrupts. Execution then branches to the secure interrupt, exception, or NMI handler. This handler can execute the appropriate action in the secure world, or jump to the non-secure world and execute the appropriate action there, depending on its design.

If the secure handler is designed to execute the handler code in the non-secure world, the required status information should be saved in secure data structures (e.g., the secure system stack). Note that the INT request in block 533 caused the original SS_RSR and SS_RAR to be overwritten, so the program executing in that case should have been designed to save the original values before enabling interrupts in the secure world. The original values should then be restored to the SS_RAR and SS_RSR registers, before executing the RETSS instruction. This will cause a jump back to the non-secure world, fetching the SSCALL instruction that initiated execution in the secure world. At this point, execution continues at block 529, where block 533 determines that an INT is pending in the non-secure world, so that execution thereafter passes through block 543 and on to block 547. When interrupt handling is complete, execution will pass from block 529, through block 533 and on to block 535, re-executing the SSCALL instruction that initiated execution in the secure world. The status information stored in secure data structures (when the secure handler code is executed in the non-secure world) will allow restart at the interrupted instruction in the secure world code.

If it is determined that the INT request is received in the non-secure world at block 543, then the method 511 may continue on to block 547 to perform non-secure world interrupt handling. The non-secure world interrupt handling varies between processor architectures and is not detailed further in this description.

If it is determined at block 533 that no INT is pending, decoding of the instruction is performed, and the method 511 may continue on to block 535. If the decoded instruction is determined at block 535 to be an SSCALL instruction, the method 511 can include changing operations to execution in the secure world at block 549, so that the current program counter is stored in SS_RAR register and the status register is stored in the SS_RSR register. Thereafter, the secure stack pointer SP_SEC is mapped into the register file, replacing the previous stack pointer. The SS bit in the register file is set, and execution jumps to the secure gateway entry address, for example at 0x80000004, and another instruction can then be fetched at block 529.

If it is determined at block 535 that execution of an SSCALL instruction is not pending, the activity at block 537 includes checking whether the decoded instruction is a RETSS instruction. If so, then the method 511 may include changing operations to the non-secure world at block 553, so that the non-secure stack pointer is replaced by the original stack pointer (e.g., SP_APP or SP_SYS, depending on the privilege mode to be used). Thereafter, the status register is replaced with the value in the SS_RSR register, and execution jumps to the address specified by the SS_RAR register. Another instruction can then be fetched at block 529.

If it is determined at block 537 that the decoded instruction is not a RETSS instruction, the method may go on to block 539 with processing the decoded instruction in the manner specified by the execution architecture.

Thus, a number of methods according to various embodiments may include processing interrupts. Such methods may include, for example, detecting an NMI when a secure state is indicated by a memory device, jumping to a secure NMI handler if a secure interrupt mask that masks the NMI is clear, jumping from the secure NMI handler to a non-secure NMI handler to handle the NMI, and returning to the secure NMI handler after processing by the non-secure NMI handler is complete.

Another method may include, for example, detecting an interrupt when a secure state is indicated by a memory device, jumping to a secure interrupt handler if a secure interrupt mask that masks the interrupt is clear, jumping from the secure interrupt handler to a non-secure interrupt handler to handle the interrupt, and returning to the secure interrupt handler after processing by the non-secure interrupt handler is complete.

Yet another method may include detecting an exception when a secure state is indicated by the memory device, and jumping to a secure exception handler responsive to the detecting. Many other methods may be devised.

The methods described herein do not have to be executed in the order described, or in any particular order. Moreover, various activities described with respect to the methods identified herein can be executed in repetitive, serial, or parallel fashion. The individual activities of the methods shown in FIGS. 4 and 5 can also be combined with each other and/or substituted, one for another, in various ways. Information, including parameters, commands, operands, and other data, can be sent and received in the form of one or more carrier waves.

Articles of Manufacture

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Figure 6:
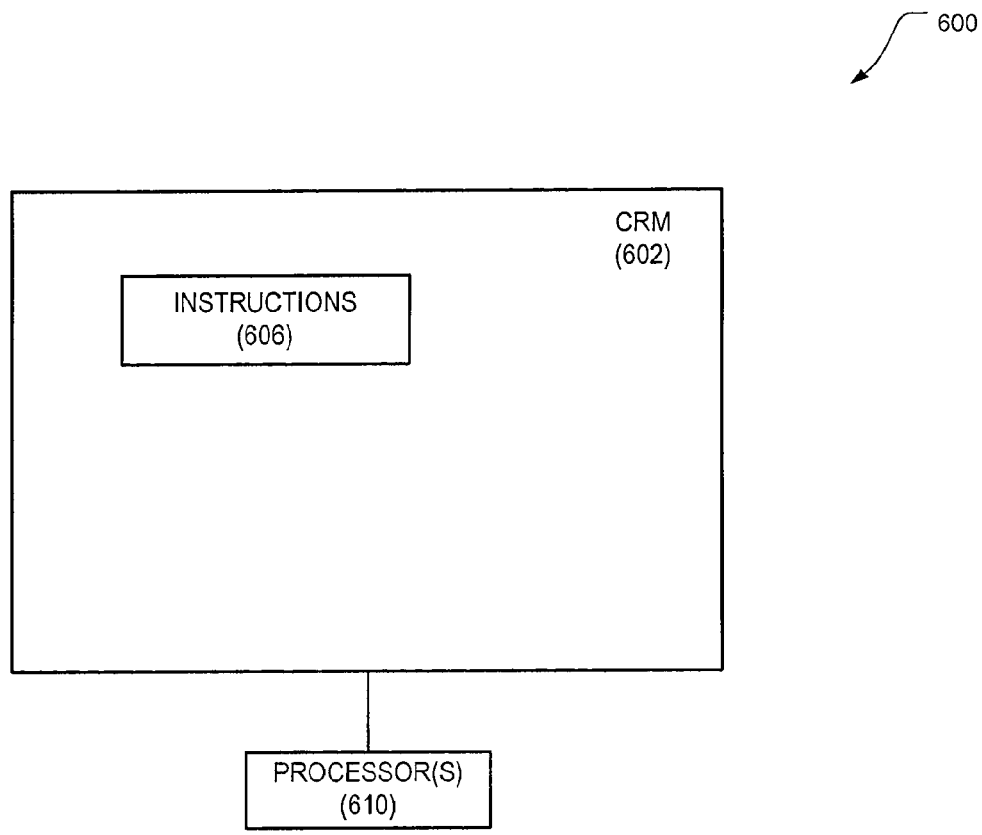
FIG. 6 is a block diagram of an article of manufacture, including a computer-readable medium according to an example embodiment.

Thus, other embodiments may be realized. For example, FIG. 6 is a block diagram of an article 600 of manufacture, including a computer-readable medium (CRM) 602 according to an example embodiment. The article 600 may comprise a computer, an integrated circuit, a memory system, a magnetic or optical disk, some other storage device, and/or any type of electronic device or system. Thus, the article 600 may include a computer 610 (having one or more processors) coupled to a computer-readable medium 602, such as a memory (e.g., fixed and removable storage media, including tangible memory having electrical, optical, or electromagnetic conductors), having associated information 606 (e.g., computer program instructions and/or data), which when executed by the computer 610, causes the computer 610 to perform a method comprising sending a request from a bus master to a memory device to access a memory domain associated with the memory device, and receiving at the bus master, from the memory device, an error communication associated with the request if the memory domain comprises any part of a secure domain, and a secure transfer indication has not been asserted by the bus master. An example of such a medium 602 and information 606 includes a die with microcode.

Further activity may include jumping to a shared secure interrupt handler if any one of a plurality of maskable interrupts is detected and a secure state is indicated by the memory device, and jumping to non-secure interrupt handlers corresponding to individual ones of the plurality of maskable interrupts when any one of the plurality of maskable interrupts is detected and a non-secure state is indicated by the memory device. Additional activity may include enabling reading and writing to a secure stack associated with a secure stack pointer when a secure state is indicated by the memory device, and disabling reading and writing to the secure stack when the secure state is not indicated, as well as placing the address of a secure subroutine call in a secure return address register of the processor when processing the secure subroutine call. Other activities may include any of those forming a portion of the methods illustrated in FIGS. 4 and 5, described above.

CONCLUSION

Implementing the apparatus, systems, and methods disclosed herein may operate to enhance the execution security that can be achieved by those utilizing relatively simple single-processor systems by allowing restricted and secure access to selected memory addresses. The mechanisms described are useful in many embedded control applications, such as industrial motor control or in automotive applications. When used, designated memory addresses can be updated only when appropriate, by authorized applications. In this way, hacking efforts and erroneous write operations that cause runaway code to execute may be avoided.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a few embodiments for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing its own as a separate embodiment.

The invention claimed is:

1. An apparatus comprising:
a substrate;
an array of memory cells supported by the substrate;
a register supported by the substrate, wherein the register includes information that associates a secure domain with a subset of the array, wherein access to the secure domain is granted responsive to receiving a request to access the secure domain in conjunction with a secure transfer indication; and
a secure domain fuse configured to restrict access to the secure domain and to secure system registers, the secure domain fuse having states that are configured to perform at least one operation selected from the group consisting of:
enable and disable secure access to the array,
enable and disable security permission checking for accesses to the array, and determine whether a system coupled to the apparatus boots in a secure world or a non-secure world.

2. The apparatus of claim 1, comprising:
a secure debug fuse having states that are configured to enable and disable at least one of tracing, single-step, or breakpoint activity associated with information stored in the secure domain.

3. The apparatus of claim 1, comprising:
at least one register to define at least one of a size or a location of the secure domain within the array.

4. The apparatus of claim 1, comprising:
secure system registers that are configured to indicate at least one of an execution status of information associated with the secure domain and a configuration of the secure domain, wherein the secure system registers are configured to be written based on a secure state being indicated by a processor coupled to the apparatus, and
wherein the secure system registers are configured to be read independent of whether the secure state is indicated.

5. The apparatus of claim 4, wherein the secure system registers are loaded at boot time associated with the apparatus for at least one of indicating a starting address of the secure domain and size of the secure domain.

6. A method comprising:
receiving, at a memory device and from a bus master, a request to access an array of memory cells associated with the memory device, wherein the array includes a secure domain associated with the memory device based on information included in a register;
determining, by the memory device, whether the request is received in conjunction with a secure transfer indication by the bus master;
in response to determining that the request is received in conjunction with the secure transfer indication, checking a state associated with a secure domain fuse that is configured to restrict access to the secure domain, the secure domain fuse having states that are configured to perform at least one operation selected from the group consisting of:
enable and disable secure access to the array,
enable and disable security permission checking for accesses to the array, and
determine whether bus master performing the request boots in a secure world or a non-secure world; and
granting access to the array including the secure domain based on the state associated with the secure domain fuse.

7. The method of claim 6, wherein the memory device includes a secure debug fuse, the method comprising:
configuring, by the memory device, an activity associated with information stored in the array based on a state of the secure debug fuse, the activity comprising enabling and disabling at least one of tracing, single-step, or breakpoint activity associated with the information stored in the array.

8. The method of claim 6, wherein the register includes information on at least one of a size or a location of the secure domain within the array.

9. The method of claim 6, wherein the memory device includes secure system registers that are configured to indicate at least one of an execution status of information associated with the secure domain and a configuration of the secure domain, the method comprising:
writing to the secure system registers based on a secure state being indicated by a processor coupled to the memory device; and
reading from the secure system registers independent of whether the secure state is indicated.

10. The method of claim 9, wherein the secure system registers are loaded at boot time associated with the memory device for at least one of indicating a starting address of the secure domain and size of the secure domain.

11. A system comprising:
a processor; and
instructions embedded in a non-transitory machine-readable medium for execution by the processor and configured to cause the processor to perform operations comprising:
receiving, at a memory device and from a bus master, a request to access an array of memory cells associated with the memory device, wherein the array includes a secure domain associated with the memory device based on information included in a register;
determining, by the memory device, whether the request is received in conjunction with a secure transfer indication by the bus master;
in response to determining that the request is received in conjunction with the secure transfer indication, checking a state associated with a secure domain fuse that is configured to restrict access to the secure domain, the secure domain fuse having states that are configured to perform at least one operation selected from the group consisting of:
enable and disable secure access to the array,
enable and disable security permission checking for accesses to the array, and
determine whether bus master performing the request boots in a secure world or a non-secure world; and
granting access to the array including the secure domain based on the state associated with the secure domain fuse.

12. The system of claim 11, wherein the memory device includes a secure debug fuse, the system including instructions that are configured to cause the processor to perform operations comprising:
configuring, by the memory device, an activity associated with information stored in the array based on a state of the secure debug fuse, the activity comprising enabling and disabling at least one of tracing, single-step, or breakpoint activity associated with the information stored in the array.

13. The system of claim 11, wherein the register includes information on at least one of a size or a location of the secure domain within the array.

14. The system of claim 11, wherein the memory device includes secure system registers that are configured to indicate at least one of an execution status of information associated with the secure domain and a configuration of the secure domain, the system including instructions that are configured to cause the processor to perform operations comprising:
writing to the secure system registers based on a secure state being indicated by the processor; and
reading from the secure system registers independent of whether the secure state is indicated.

15. The system of claim 14, wherein the secure system registers are loaded at boot time associated with the memory device for at least one of indicating a starting address of the secure domain and size of the secure domain.

* * * * *

UNITED STATES PATENT AND TRADEMARK OFFICE
CERTIFICATE OF CORRECTION

PATENT NO. : 8,443,423 B2  
APPLICATION NO. : 13/267933  
DATED : May 14, 2013  
INVENTOR(S) : Erik Knutsen Renno Page 1 of 1

It is certified that error appears in the above-identified patent and that said Letters Patent is hereby corrected as shown below:

In the Specification:

In Column 4, Line 4 delete "asserted)" and insert --asserted).--, therefor.

In Column 4, Line 60 delete "world" and insert --world.--, therefor.

In column 6, Line 40 delete "INTO" and insert --INT0--, therefor.

In Column 9, Line 26 delete "SS_RAR" and insert --SS_RSR--, therefor.

In Column 13, Line 44 delete "note" and insert --noted--, therefor.

In Column 17, Line 38 (approx) delete "its" and insert --on its--, therefor.

Signed and Sealed this  
Sixth Day of August, 2013

Teresa Stanek Rea  
*Acting Director of the United States Patent and Trademark Office*